US012472811B2

(12) United States Patent
Okuda et al.

(10) Patent No.: US 12,472,811 B2
(45) Date of Patent: Nov. 18, 2025

(54) DRIVE APPARATUS FOR VEHICLE

(71) Applicant: TOYOTA JIDOSHA KABUSHIKI KAISHA, Toyota (JP)

(72) Inventors: Koichi Okuda, Toyota (JP); Naoki Itazu, Nagoya (JP); Satoshi Kasamai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 401 days.

(21) Appl. No.: 18/094,773

(22) Filed: Jan. 9, 2023

(65) Prior Publication Data

US 2023/0219409 A1 Jul. 13, 2023

(30) Foreign Application Priority Data

Jan. 12, 2022 (JP) .................................. 2022-003335

(51) Int. Cl.
*B60K 1/02* (2006.01)
*B60K 17/04* (2006.01)
*F16H 1/20* (2006.01)
*F16H 57/02* (2012.01)

(52) U.S. Cl.
CPC ................ *B60K 17/04* (2013.01); *B60K 1/02* (2013.01); *F16H 1/20* (2013.01); *F16H 2057/02034* (2013.01); *F16H 2057/02052* (2013.01)

(58) Field of Classification Search
CPC .......... B60K 17/04; B60K 1/02; B60K 23/04; F16H 1/20; F16H 2057/02034; F16H 2057/02052

USPC ...................................................... 180/65.6
See application file for complete search history.

(56) References Cited

U.S. PATENT DOCUMENTS

| 6,398,685 | B1 * | 6/2002 | Wachauer | B60L 15/2036 180/65.6 |
| 7,980,340 | B2 * | 7/2011 | Luo | B60W 20/00 180/65.21 |
| 10,021,831 | B2 * | 7/2018 | Ito | A01D 67/00 |
| 10,384,535 | B2 * | 8/2019 | Isono | B60K 17/046 |
| 10,442,291 | B2 * | 10/2019 | Isono | B60K 23/04 |
| 10,895,320 | B2 * | 1/2021 | Suyama | F16H 48/10 |
| 2014/0116201 | A1 | 5/2014 | Spiegel et al. | |

(Continued)

FOREIGN PATENT DOCUMENTS

JP 2014-084102 A 5/2014
JP 2016-205488 A 12/2016

*Primary Examiner* — Hau V Phan
(74) *Attorney, Agent, or Firm* — Sughrue Mion, PLLC

(57) ABSTRACT

A drive apparatus is for a vehicle that includes left and right wheels. The drive apparatus includes: (a) a left-side gear transmission mechanism disposed between a left-side drive source and the left wheel; and (b) a right-side gear transmission mechanism disposed between a right-side drive source and the right wheel. Each of the left-side and right-side gear transmission mechanisms includes a plurality of rotary shafts and a plurality of gears. The left-side and right-side gear transmission mechanisms are the same as each other in terms of a number of the rotary shafts, a number of the gears and a positional relationship between the gears. Each of the gears of the left-side gear transmission mechanism and a corresponding one of the gears of the right-side gear transmission mechanism are identical with each other and disposed in the same attitude as each other.

7 Claims, 4 Drawing Sheets

(56) References Cited

U.S. PATENT DOCUMENTS

| | | | |
|---|---|---|---|
| 2015/0267721 A1* | 9/2015 | Yasuda | B60K 17/043 |
| | | | 60/487 |
| 2018/0118023 A1* | 5/2018 | Makino | F16H 57/04 |
| 2018/0141423 A1 | 5/2018 | Makino et al. | |
| 2019/0248247 A1* | 8/2019 | Yamaguchi | B60K 1/02 |
| 2019/0264790 A1* | 8/2019 | Suzuki | F16H 57/04 |
| 2020/0009959 A1* | 1/2020 | Fukasawa | B60G 21/051 |

\* cited by examiner

DRIVE APPARATUS FOR VEHICLE

This application claims priority from Japanese Patent Application No. 2022-003335 filed on Jan. 12, 2022, the disclosure of which is herein incorporated by reference in its entirety.

FIELD OF THE INVENTION

The present invention relates to a drive apparatus for a vehicle, and more particularly, to a vehicle drive apparatus including a left-side drive source configured to drive a left wheel of the vehicle; a left-side gear transmission mechanism, a right-side drive source configured to drive a right wheel of the vehicle, and a right-side gear transmission mechanism, wherein a combination of the left-side drive source and the left-side gear transmission mechanism and a combination of the right-side drive source and the right-side gear transmission mechanism are provided independently of each other.

BACKGROUND OF THE INVENTION

There is known a drive apparatus for a vehicle, which includes (a) a left-side drive source configured to drive a left wheel of the vehicle; (b) a right-side drive source configured to drive a right wheel of the vehicle; (c) a left-side gear transmission mechanism which is disposed in a power transmission path between the left-side drive source and the left wheel; and (d) a right-side gear transmission mechanism which is disposed in a power transmission path between the right-side drive source and the right wheel and which has the same gear ratio as the left-side gear transmission mechanism, (e) wherein each of the left-side gear transmission mechanism and the right-side gear transmission mechanism includes a plurality of rotary shafts that extend substantially in parallel to a width direction of the vehicle, and a plurality of gears provided on the plurality of rotary shafts, and wherein a number of the plurality of rotary shafts of the left-side gear transmission mechanism and a number of the plurality of rotary shafts of the right-side gear transmission mechanism are the same as each other, and a number of the plurality of gears of the left-side gear transmission mechanism and a number of the plurality of gears of the right-side gear transmission mechanism are the same as each other. As an example of such a drive apparatus, JP-2016-205488A discloses a drive apparatus in which the left-side and right-side drive sources are constituted by respective electric motors, and a combination of the left-side drive source and the left-side gear transmission mechanism and a combination of the right-side drive source and the right-side gear transmission mechanism are arranged symmetrically and opposed to each other in a width direction of the vehicle.

SUMMARY OF THE INVENTION

However, where the left-side and right-side gear transmission mechanisms are arranged symmetrically in the width direction of the vehicle, as in the above-identified Japanese Patent Application Publication, during rotations of the gears, each of the gears is brought into contact at one of opposite side faces of each tooth with adjacent one of the gears in the left-side gear transmission mechanism while a corresponding one of the gears is brought into contact at the other of opposite side faces of each tooth with adjacent one of the gears in the right-side gear transmission mechanism. That is, the corresponding gears of the respective left-side and right-side gear transmission mechanisms are different from each other in terms of which one of the opposite side faces of each tooth is brought into contact with adjacent gears. Therefore, although the corresponding gears of the respective left-side and right-side gear transmission mechanisms are the same as each other in terms of number of teeth and circular pitch, they need to be constituted by respective gears different from each other, thereby increasing cost of manufacturing the gears and making it difficult to sufficiently reduce NV (Noise and Vibration). Each gear is brought into contact at one of opposite side faces of each tooth with the adjacent gear when a drive wheel of the vehicle is driven by the drive source, and is brought into contact at the other of the opposite side faces of each tooth with the adjacent gear when the drive source is rotated by the drive wheel. Therefore, the faces of each tooth of each gear are required to be subjected to retouching operations such as crowning and bias, so as to be appropriately shaped to suppress the NV. However, where the left-side and right-side gear transmission mechanisms are arranged symmetrically in the width direction of the vehicle, as described above, since the corresponding gears of the respective left-side and right-side gear transmission mechanisms are constituted by respective gears different from each other, the appropriate shaping of the tooth faces of each of the corresponding gears has to be made independently of that of the tooth faces of the other of the corresponding gears, thereby increasing the manufacturing cost including a cost of design. Moreover, since the corresponding gears of the respective left-side and right-side gear transmission mechanisms are constituted by the respective different gears, the left-side and right-side gear transmission mechanisms are different from each other in terms of characteristics of the NV, so that it is difficult to reduce the NV in the vehicle as a whole.

The present invention was made in view of the background art described above. It is therefore an object of the present invention to reduce a cost for manufacturing a drive apparatus for a vehicle and to improve NV performance of the drive apparatus, wherein a combination of a left-side drive source and a left-side gear transmission mechanism for driving a left wheel of the vehicle and a combination of a right-side drive source and a right-side gear transmission mechanism for driving a right wheel of the vehicle are provided independently of each other in the drive apparatus.

The object indicated above is achieved according to the following aspects of the present invention.

According to a first aspect of the invention, there is provided a drive apparatus for a vehicle that includes left and right wheels. The drive apparatus includes: (a) a left-side drive source configured to drive the left wheel; (b) a right-side drive source configured to drive the right wheel; (c) a left-side gear transmission mechanism which is disposed in a power transmission path between the left-side drive source and the left wheel; and (d) a right-side gear transmission mechanism which is disposed in a power transmission path between the right-side drive source and the right wheel and which has the same gear ratio as the left-side gear transmission mechanism. Each of the left-side gear transmission mechanism and the right-side gear transmission mechanism includes a plurality of rotary shafts that extend substantially in parallel to a width direction of the vehicle, and a plurality of gears provided on the plurality of rotary shafts. A number of the plurality of rotary shafts of the left-side gear transmission mechanism and a number of the plurality of rotary shafts of the right-side gear transmission mechanism are the same as each other, and a number of the plurality of gears of the left-side gear transmission mechanism and a number of the plurality of gears of the right-side gear transmission mechanism are the same as each other. A positional relationship between the plurality of gears of the left-side gear transmission mechanism and a positional relationship between the plurality of gears of the right-side gear transmission mechanism are the same as each other. Each of the plurality of gears of the left-side gear transmission mechanism and a corresponding one of the plurality of gears of the right-side gear transmission mechanism are identical with each other and disposed in the same attitude as each other.

According to a second aspect of the invention, in the drive apparatus according to the first aspect of the invention, each of the left-side gear transmission mechanism and the right-side gear transmission mechanism includes, as one of the plurality of rotary shafts, a connection rotary shaft provided with splines and one of the plurality of gears, wherein the left-side gear transmission mechanism and the right-side gear transmission mechanism are different from each other in terms of an axial distance between the splines and the one of the plurality of gears of the connection rotary shaft, such that the positional relationship between the plurality of gears of the left-side gear transmission mechanism and the positional relationship between the plurality of gears of the right-side gear transmission mechanism are the same as each other.

According to a third aspect of the invention, in the drive apparatus according to the first or second aspect of the invention, each of the left-side gear transmission mechanism and the right-side gear transmission mechanism includes, as one of the plurality of rotary shafts, an intermediate rotary shaft provided with a large-diameter gear and a small-diameter gear as ones of the plurality of gears, which are axially spaced apart from each other, wherein the intermediate rotary shaft is supported by a bearing, such that at least a part of the bearing is located on an inner peripheral side of the large-diameter gear.

According to a fourth aspect of the invention, in the drive apparatus according to any one of the first through third aspects of the invention, the plurality of rotary shafts of the left-side gear transmission mechanism and the plurality of rotary shafts of the right-side gear transmission mechanism are disposed on at least one common axis, wherein each of the plurality of gears of the left-side gear transmission mechanism and a corresponding one of the plurality of gears of the right-side gear transmission mechanism are arranged to be parallelly offset from each other in the width direction of the vehicle. The plurality of rotary shafts of the left-side gear transmission mechanism and the plurality of rotary shafts of the right-side gear transmission mechanism may be disposed on respective common axes as the at least one common axis, or alternatively, at least two of the plurality of rotary shafts of the left-side gear transmission mechanism and corresponding at least two of the plurality of rotary shafts of the right-side gear transmission mechanism may be disposed on a single common axis as the at least one common axis such that the at least two of the plurality of rotary shafts of each of the left-side and right-side gear transmission mechanisms are arranged in a series on the single common axis or arranged to form a double structure on the single common axis.

According to a fifth aspect of the invention, in the drive apparatus according to any one of the first through fourth aspects of the invention, the plurality of gears of each of the left-side gear transmission mechanism and the right-side gear transmission mechanism include at least one pair of helical gears that mesh with each other, wherein the left-side gear transmission mechanism and the right-side gear transmission mechanism are housed in a common casing constituted by a plurality of casing members which are arranged in the width direction of the vehicle and which are fixed to each other.

According to a sixth aspect of the invention, in the drive apparatus according to any one of the first through fifth aspects of the invention, the left-side drive source and the right-side drive source are arranged to be symmetrical with each other and spaced apart from each other in the width direction of the vehicle, wherein the left-side drive source and the right-side drive source have respective output shafts which extend substantially in parallel to the width direction of the vehicle, and wherein the left-side gear transmission mechanism and the right-side gear transmission mechanism are disposed between the left-side drive source and the right-side drive source in the width direction of the vehicle.

According to a seventh aspect of the invention, in the drive apparatus according to the sixth aspect of the invention, the output shafts of the left-side drive source and the right-side drive source are disposed commonly on a first axis that is substantially parallel to the width direction of the vehicle, wherein the plurality of rotary shafts of each of the left-side gear transmission mechanism and the right-side gear transmission mechanism include an input rotary shaft, an intermediate rotary shaft and an output rotary shaft, wherein the input rotary shaft of each of the left-side gear transmission mechanism and the right-side gear transmission mechanism is disposed on the first axis, and is provided with splines and a drive gear that is one of the plurality of gears, wherein the input rotary shaft of the left-side gear transmission mechanism is connected to the left-side drive source through the splines in a power transmittable manner, while the input rotary shaft of the right-side gear transmission mechanism is connected to the right-side drive source through the splines in a power transmittable manner, wherein the intermediate rotary shaft of each of the left-side gear transmission mechanism and the right-side gear transmission mechanism is disposed on a second axis that is parallel to the first axis, and is provided with a large-diameter gear and a small-diameter gear as ones of the plurality of gears, such that the large-diameter gear and the small-diameter gear are axially spaced apart from each other, and such that rotation is to be transmitted to the large-diameter gear from the drive gear, wherein the output rotary shaft of each of the left-side gear transmission mechanism and the right-side gear transmission mechanism is disposed on a third axis that is parallel to the first axis, and is provided with a driven gear as one of the plurality of gears, such that rotation is to be transmitted to the driven gear from the small-diameter gear, wherein the output rotary shaft of each of the left-side gear transmission mechanism and the right-side gear transmission mechanism is connected to a drive shaft of the vehicle in a power transmittable manner, wherein the positional relationship among the drive gear, the large-diameter gear, the small-diameter gear and the driven gear of the left-side gear transmission mechanism and the positional relationship among the drive gear, the large-diameter gear, the small-diameter gear and the driven gear of the right-side gear transmission mechanism are the same as each other, wherein each of the drive gear, the large-diameter gear, the small-diameter gear and the driven gear of the left-side gear transmission mechanism and a corresponding one of the drive gear, the large-diameter gear, the small-diameter gear and the driven gear of the right-side gear transmission mechanism are arranged to be parallelly offset from each other in the width direction of the vehicle, and wherein the drive gear is located on one of opposite sides of the splines in the width direction of the vehicle in the left-side gear transmission mechanism while the drive gear is located on the other of the opposite sides of the splines in the width direction of the vehicle in the right-side gear transmission mechanism, and an axial distance between the drive gear and the splines in the left-side gear transmission mechanism and an axial distance between the drive gear and the splines in right-side gear transmission mechanism are different from each other, such that the positional relationship among the drive gear, the large-diameter gear, the small-diameter gear and the driven gear of the left-side gear transmission mechanism and the positional relationship among the drive gear, the large-diameter gear, the small-diameter gear and the driven gear of the right-side gear transmission mechanism are the same as each other.

In the drive apparatus according to any one of the first through seventh aspects of the invention, the positional relationship between the plurality of gears of the left-side gear transmission mechanism and the positional relationship between the plurality of gears of the right-side gear transmission mechanism are the same as each other, and each of the plurality of gears of the left-side gear transmission mechanism and a corresponding one of the plurality of gears of the right-side gear transmission mechanism are identical with each other and can be constituted by the same gears. Therefore, it is possible to reduce the manufacturing cost including the cost of design such as retouched shapes of tooth faces of each of the gears, and to appropriately improve NV performance of the drive apparatus as a whole since the left-side and right-side gear transmission mechanisms are made the same as each other in terms of characteristics of the NV.

In the drive apparatus according to the second aspect of the invention, each of the left-side and right-side gear transmission mechanisms includes, as one of the plurality of rotary shafts, the connection rotary shaft provided with the splines and the corresponding one of the plurality of gears, and the left-side and right-side gear transmission mechanisms are different from each other in terms of an axial distance between the splines and the corresponding one of the plurality of gears of the connection rotary shaft, such that the positional relationship between the plurality of gears of the left-side gear transmission mechanism and the positional relationship between the plurality of gears of the right-side gear transmission mechanism are the same as each other. Therefore, the left-side and right-side gear transmission mechanisms are made different from each other in terms of a rigidity of the connection rotary shaft, thereby suppressing a resonance and accordingly further improving the NV performance.

In the drive apparatus according to the third aspect of the invention, each of the left-side and right-side gear transmission mechanisms includes, as one of the plurality of rotary shafts, the intermediate rotary shaft provided with the large-diameter gear and the small-diameter gear as ones of the plurality of gears, which are axially spaced apart from each other, and the intermediate rotary shaft is supported by the bearing, such that at least a part of the bearing is located on the inner peripheral side of the large-diameter gear. Therefore, it is possible to reduce a dimension of a part of the drive apparatus in an axial direction, i.e., the width direction of the vehicle, wherein the intermediate rotary shaft of each of the left-side and right-side gear transmission mechanisms is disposed in the part of the drive apparatus. The reduction of the dimension of the above-described part of the drive apparatus results in improvement of mountability of the drive apparatus in the vehicle.

In the drive apparatus according to the fourth aspect of the invention, the plurality of rotary shafts of the left-side gear transmission mechanism and the plurality of rotary shafts of the right-side gear transmission mechanism are disposed on at least one common axis, and each of the plurality of gears of the left-side gear transmission mechanism and the corresponding one of the plurality of gears of the right-side gear transmission mechanism are arranged to be parallelly offset from each other in the width direction of the vehicle. Therefore, the left-side and right-side gear transmission mechanisms are identical in construction with each other, so that the drive apparatus can be easily constructed with a low cost.

In the drive apparatus according to the fifth aspect of the invention, the plurality of gears of each of the left-side and right-side gear transmission mechanisms include at least one pair of helical gears that mesh with each other, and the left-side and right-side gear transmission mechanisms are housed in the common casing constituted by the plurality of casing members which are arranged in the width direction of the vehicle and which are fixed to each other, such that each adjacent pair of the casing members are held in contact at their respective contact surfaces with other. Therefore, when the helical gears are rotated, a thrust force applied to each of the helical gears of the left-side gear transmission mechanism and a thrust force applied to a corresponding one of the helical gears of the right-side gear transmission mechanism act in the same direction, so that it is possible to reduce a load that forces the contact surfaces (of each adjacent pair of the casing members) to be separated from each other, and accordingly to suppress oil leakage or the like due to separation of the contact surfaces away from each other.

In the drive apparatus according to the sixth aspect of the invention, the left-side drive source and the right-side drive source are arranged to be symmetrical with each other and spaced apart from each other in the width direction of the vehicle, and the left-side and right-side gear transmission mechanisms are disposed between the left-side drive source and the right-side drive source in the width direction of the vehicle. Therefore, the left-side and right-side gear transmission mechanisms can be disposed in respective positions close to each other in the width direction of the vehicle, so that the drive apparatus can be made compact in size, for example, by housing both of the left-side and right-side gear transmission mechanisms in the common casing.

In the drive apparatus according to the seventh aspect of the invention, the plurality of rotary shafts of each of the left-side and right-side gear transmission mechanisms include three rotary shafts in the form of the input rotary shaft, the intermediate rotary shaft and the output rotary shaft, such that each of the three rotary shafts of the left-side gear transmission mechanism and a corresponding one of the three rotary shafts of the right-side and right-side gear transmission mechanism are disposed on the common axis. Further, each of the plurality of gears of the left-side gear transmission mechanism and a corresponding one of the plurality of gears of the right-side gear transmission mechanism are arranged to be parallelly offset from each other in the width direction of the vehicle, wherein the drive gear is located on one of the opposite sides of the splines in the width direction in the left-side gear transmission mechanism while the drive gear is located on the other of the opposite sides of the splines in the width direction in the right-side gear transmission mechanism, and the axial distance between the drive gear and the splines in the left-side gear transmission mechanism and the axial distance between the drive gear and the splines in right-side gear transmission mechanism are different from each other, such that the positional relationship between the plurality of gears of the left-side gear transmission mechanism and the positional relationship between the plurality of gears of the right-side gear transmission mechanism are the same as each other. Thus, it is possible to obtain substantially the same effects as in each of the above-described second and fourth aspects of the invention. It is noted that the input rotary shaft corresponds to the connection rotary shaft in the second aspect of the invention.

DETAILED DESCRIPTION OF PREFERRED EMBODIMENTS

Figure 1:
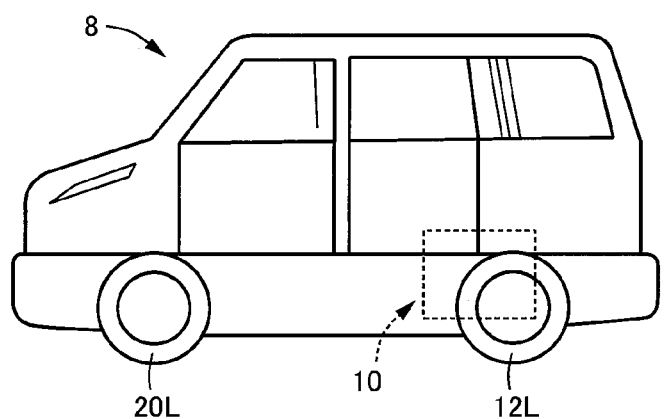
FIG. 1 is a left-side view schematically showing an electric vehicle, as seen from a left side of the vehicle, wherein the vehicle is provided with a drive apparatus as an embodiment of the present invention.

In the present invention, the drive apparatus may be configured to drive and rotate either rear left and right wheels or front left and right wheels of the vehicle. Although the present invention is advantageously applicable to an electric drive vehicle including electric motors as left-side and right-side drive sources, it is applicable also to an engine drive vehicle including only engines (internal combustion engines) as the drive sources. Each of the electric motors may be also a motor generator serving as an electric power generator as well as an electric power source. The electric drive vehicle may be either an electric vehicle including only the electric motors as the drive sources or a hybrid electric drive vehicle including the electric motor and the engine as the drive sources.

The left-side and right-side drive sources are disposed transversely, such that axes of their respective output rotary shafts extend in a direction substantially parallel to the width direction of the vehicle. The left-side and right-side drive sources may be disposed, such that the left-side and right-side drive sources have respective attitudes which are opposite to each other and are symmetrical with each other, namely, have inward or outward attitudes, or alternatively, such that the left-side and right-side drive sources have respective attitudes which are the same as each other and which face in one of opposite directions parallel to the vehicle width direction. That is, it is possible to employ a pair of drive units including respective drive sources and gear transmission mechanisms, wherein the pair of drive units are arranged in parallel in the vehicle width direction and are the same as each other in terms of constructions of the drive source and the gear transmission mechanism and also a positional relationship between the drive source and the gear transmission mechanism. In this case, where the pair of drive units are different from each other in terms of an axial distance between the gear transmission mechanism and the wheel, the difference of the axial distance may be compensated, for example, by making axial lengths of the respective drive shafts different from each other. Moreover, the left-side and right-side drive sources may be disposed longitudinally (rather than transversely) so that the axes of the output rotary shafts are substantially parallel to a longitudinal direction of the vehicle. In this case, rotation of each of the drive sources can be transmitted to a corresponding one of the left-side and right-side gear transmission mechanisms through bevel gears, hypoid gears or the like. Thus, various modes are possible for attitude of each of the drive sources.

Each of the left-side and right-side gear transmission mechanisms includes the plurality of rotary shafts and the plurality of gears, and may be constituted by any of various kinds of transmissions such as a planetary gear transmission and a mesh parallel shaft transmission. The gears included in each of the transmission mechanisms are provided on the rotary shafts. However, in addition to the gears provided on the rotary shafts, it is possible to employ a gear and/or a carrier of a planetary gear device, for example, which meshes with the gears provided on the rotary shafts and which are unrotatably fixed to a casing or the like. Each of the gear transmission mechanisms may be either a speed reducer or a speed increaser having a constant gear ratio, or may be either a step-variable transmission or a forward/reverse switching device having a gear ratio variable depending on operation states of engagement devices (such as clutch and brake) each of which is to be selectively engaged and released. Although each of the rotary shafts of the left-side gear transmission mechanism and a corresponding one of the rotary shafts of the right-side gear transmission mechanism are preferably disposed on a common axis, they may be disposed on respective axes different from each other. For example, it is possible arrange the rotary shafts of the left-side and right-side gear transmission mechanisms, for example, such that only the output rotary shafts connected to the respective drive shafts are disposed on a common axis while the other rotary shafts such as the input rotary shafts and the intermediate shafts are disposed on axes that are offset from each other around the common axis of the output rotary shafts.

Where the rotary shafts of each of the left-side and right-side gear transmission mechanisms includes three rotary shafts consisting of the input rotary shaft connected to the drive source, the intermediate rotary shaft and the output rotary shaft connected to the drive shaft, the rotary shafts may further include at least one another intermediate shaft. Further, the rotary shafts may include only two rotary shafts consisting of the input rotary shaft and the output rotary shaft, without including the intermediate shaft. The input rotary shaft and the output rotary shaft are disposed on respective axes which are different from each other and which are parallel to each other, for example. However, the input rotary shaft and the output rotary shaft may be disposed on a common axis so as to form a double structure or the like. In that case, a planetary gear transmission is advantageously used as each of the gear transmission mechanisms. Although each of the gears included in the transmission mechanisms is preferably a helical gear having a tooth form generated on a helical path about its axis, it may be a spur gear having a tooth form parallel to its axis. Where the intermediate rotary shaft is provided with the large-diameter gear and the small-diameter gear that are axially spaced apart from each other, it is preferable that at least a part of the bearing supporting the intermediate rotary shaft is located on an inner peripheral side of the large-diameter gear. However, the bearing supporting the intermediate rotary shaft may be located such that the bearing does not overlap with the large-diameter gear and the small-diameter gear in the axial direction.

The drive apparatus according to the present invention includes, for example, (a) a left-side drive unit including (a-1) a left-side drive source configured to drive the left wheel and (a-2) a left-side gear transmission mechanism which is disposed in a power transmission path between the left-side drive source and the left wheel, and (b) a right-side drive unit including (b-1) a right-side drive source configured to drive the right wheel and (b-2) a right-side gear transmission mechanism which is disposed in a power transmission path between the right-side drive source and the right wheel and which has the same gear ratio as the left-side gear transmission mechanism, wherein each of the left-side gear transmission mechanism and the right-side gear transmission mechanism includes a plurality of rotary shafts that extend substantially in parallel to a width direction of the vehicle, and a plurality of gears provided on the plurality of rotary shafts, wherein a number of the plurality of rotary shafts of the left-side gear transmission mechanism and a number of the plurality of rotary shafts of the right-side gear transmission mechanism are the same as each other, and a number of the plurality of gears of the left-side gear transmission mechanism and a number of the plurality of gears of the right-side gear transmission mechanism are the same as each other, and wherein the left-side drive unit and the right-side drive unit are disposed to be adjacent to each other in the width direction within a common casing and are configured to drive front left and right wheels or rear left and right wheels of the vehicle.

EMBODIMENTS

There will be described embodiments of the present invention in details with reference to drawings. It is noted that figures of the drawings are simplified or deformed as needed, and each portion is not necessarily precisely depicted in terms of dimension ratio, shape, angle, etc.

Figure 2:
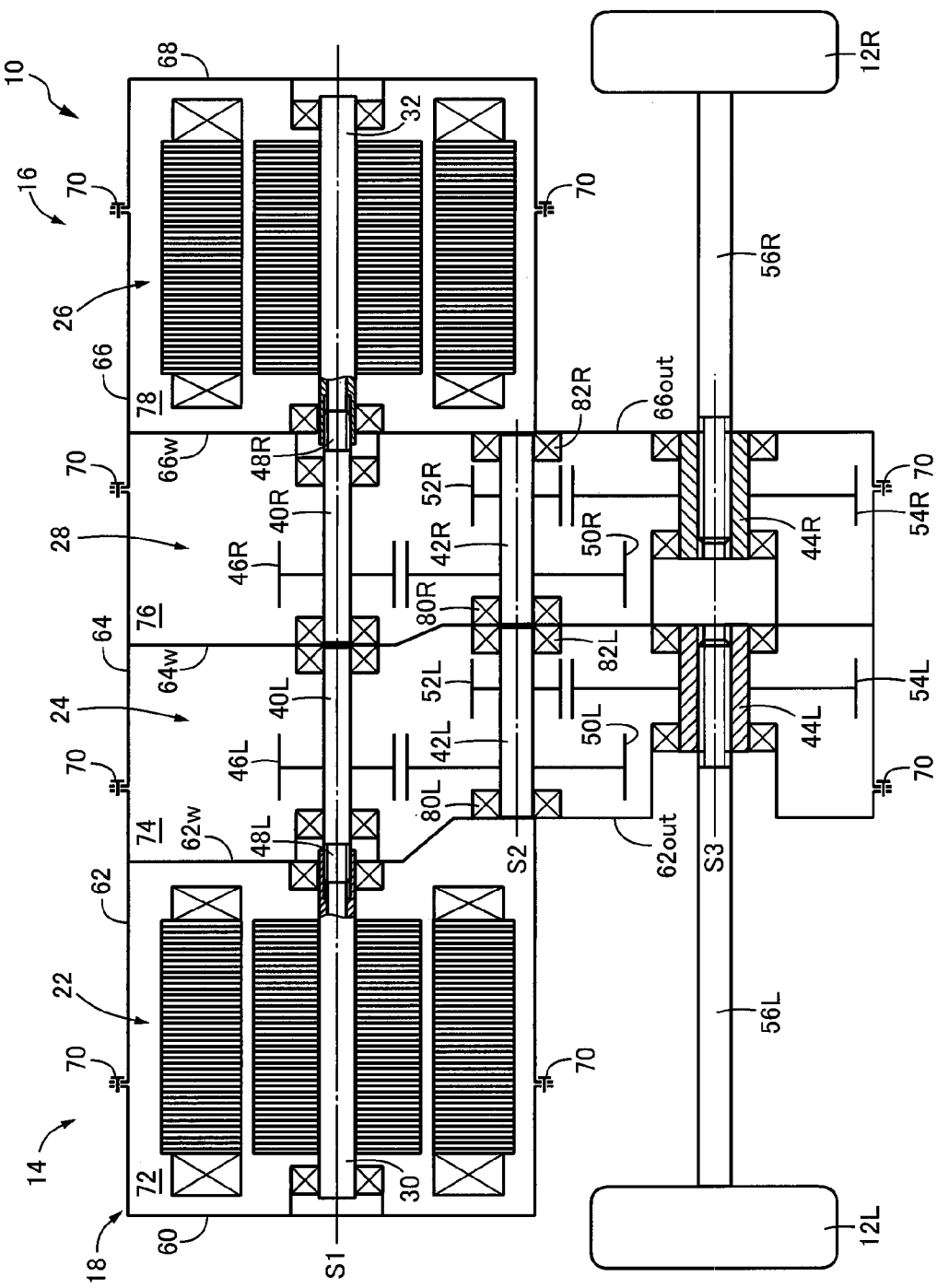
FIG. 2 is a view schematically showing a construction of an electric drive unit provided in the electric vehicle of FIG. 1, wherein the view is a cross-sectional view obtained by cutting the electric drive unit in a width direction of the vehicle and unfolding the cross-sectional view such that a plurality of axes S1-S3 lie on a single plain.

FIG. 1 is a left-side view schematically showing an electric vehicle 8, as seen from a left side of the vehicle 8, wherein the vehicle 8 is provided with a drive apparatus in the form of an electric drive unit 10 that is an embodiment of the present invention. FIG. 2 is a view schematically showing a construction of the electric drive unit 10, wherein the view is a cross-sectional view obtained by cutting the electric drive unit 10 in a width direction of the vehicle 8 (hereinafter referred to as "vehicle width direction") and unfolding the cross-sectional view such that first through third axes S1-S3 lie on a single plain. The first through third axes S1-S3 are axes on which a plurality of shafts are disposed. The electric drive unit 10 is to be provided in a rear portion of the electric vehicle 8, so as to drive and rotate rear left and right wheels 12L, 12R. The electric drive unit 10 includes a left-side drive unit 14 configured to drive and rotate the rear left wheel 12L and a right-side drive unit 16 configured to drive and rotate the rear right wheel 12R. The left-side drive unit 14 and the right-side drive unit 16 are disposed to be adjacent to each other in the vehicle width direction, and are housed within a common casing 18. Although the electric vehicle 8 is driven to run, for example, with only an onboard battery serving as an electric power source, the electric vehicle 8 may be provided with an electric power generator such as fuel cell. The first through third axes S1-S3 are parallel to one another, and the electric drive unit 10 is disposed in the electric vehicle 8, to have an attitude that makes the first through third axes S1-S3 substantially parallel to the vehicle width direction. Although the electric vehicle 8 is a rear-wheel drive vehicle, the vehicle 8 may be a front-wheel drive vehicle with the electric drive unit 10 being arranged to drive and rotate front left and right wheels 20L, 20R.

The left-side drive unit 14 includes a left-side MG 22 as a left-side electric motor, and a gear train which is provided in a power transmission path between the left-side MG 22 and the rear left wheel 12L and which serves as a left-side gear transmission mechanism 24. Similarly, the right-side drive unit 16 includes a right-side MG 26 as a right-side electric motor, and a gear train which is provided in a power transmission path between the right-side MG 26 and the rear right wheel 12R and which serves as a right-side gear transmission mechanism 28. Each of the left-side MG 22 and the right-side MG 26 is a motor generator serving as a selected one of an electric motor and an electric power generator. The left-side MG 22 and the right-side MG 26 are disposed transversely and spaced apart from each other in the vehicle width direction, such that their respective output shafts in the form of MG shafts 30, 32 are located on a common axis in the form of a first axis S1. Each of the left-side MG 22 and the right-side MG 26 is disposed to have an inward attitude that makes the MG shafts 30, 32 opposed to each other in the vehicle width direction. The left-side MG 22 and the right-side MG 26 are disposed symmetrically with each other with respect to the center line O. The left-side gear transmission mechanism 24 and the right-side gear transmission mechanism 28 are disposed to be adjacent to each other between the left-side MG 22 and the right-side MG 26 in the vehicle width direction. The left-side MG 22 and the right-side MG 26 are constituted by respective motor generators identical with each other and having the same standard, so that their respective rotors and stators are the same in axial length (stack thickness) and diameter. The left-side gear transmission mechanism 24 and the right-side gear transmission mechanism 28 serve as respective speed reducers configured to reduce speed at respective constant gear ratios that are equal to each other.

The left-side gear transmission mechanism 24 includes the plurality of shafts in the form of three left-side rotary shafts in the form of an input rotary shaft 40L, an intermediate rotary shaft 42L and an output rotary shaft 44L. The right-side gear transmission mechanism 28 includes the plurality of shafts in the form of three right-side rotary shafts in the form of an input rotary shaft 40R, an intermediate rotary shaft 42R and an output rotary shaft 44R. The input rotary shafts 40L, 40R are both disposed on the first axis S1, and are provided with respective drive gears 46L, 46R and splines 48L, 48R. The input rotary shaft 40L is connected through the splines 48L to the MG shaft 30 of the left-side MG 22 in a power transmittable manner. The input rotary shaft 40R is connected through the splines 48R to the MG shaft 32 of the right-side MG 26 in a power transmittable manner. Each of the input rotary shafts 40L, 40R corresponds to "connection rotary shaft" recited in the appended claims. The intermediate shafts 42L, 42R are both disposed on a common axis in the form of a second axis S2 parallel to the first axis S1, and are provided with respective large-diameter gears 50L, 50R and small-diameter gears 52L, 52R. Each of the large-diameter gears 50L, 50R and a corresponding one of the small-diameter gears 52L, 52R are axially spaced apart from each other. Each of the large-diameter gears 50L, 50R and a corresponding one of the drive gears 46L, 46R mesh with each other so as to transmit rotation therebetween. In the present embodiment, the small-diameter gears 52L, 52R and the large-diameter gears 50L, 50R are located in respective positions that are symmetrical with respect to the center line O, such that the small-diameter gears 52L, 52R are closer to the center line O in the vehicle width direction as compared with the large-diameter gears 50L, 50R that are located outside of the small-diameter gears 52L, 52R in the vehicle width direction. The output rotary shafts 44L, 44R are both disposed on a common axis in the form of a third axis S3 parallel to the first axis S1. Each of the output rotary shafts 44L, 44R is connected to a corresponding one of drive shafts 56L, 56R through splines or the like in a power transmittable manner. The output rotary shafts 44L, 44R are provided with respective driven gears 54L, 54R that mesh with the respective small-diameter gears 52L, 52R so as to transmit rotation therebetween. Thus, rotations outputted from the respective left-side MG 22 and right-side MG 26 are reduced in speed by the respective left-side gear transmission mechanism 24 and right-side gear transmission mechanism 28 at the same gear ratio, and then are transmitted to the respective left and right drive shafts 56L, 56R, so that the rear left and right wheels 12L, 12R are driven and rotated at respective speeds that can be different from each other. Constant-velocity joints or the like are provided between the output rotary shafts 44L, 44R and the drive shafts 56L, 56R and between the drive shafts 56L, 56R and the rear wheels 12L, 12R, as needed. In the following description, the letters "L" and "R" after reference numerals are not provided unless left and right are to be distinguished from each other.

Figure 3:
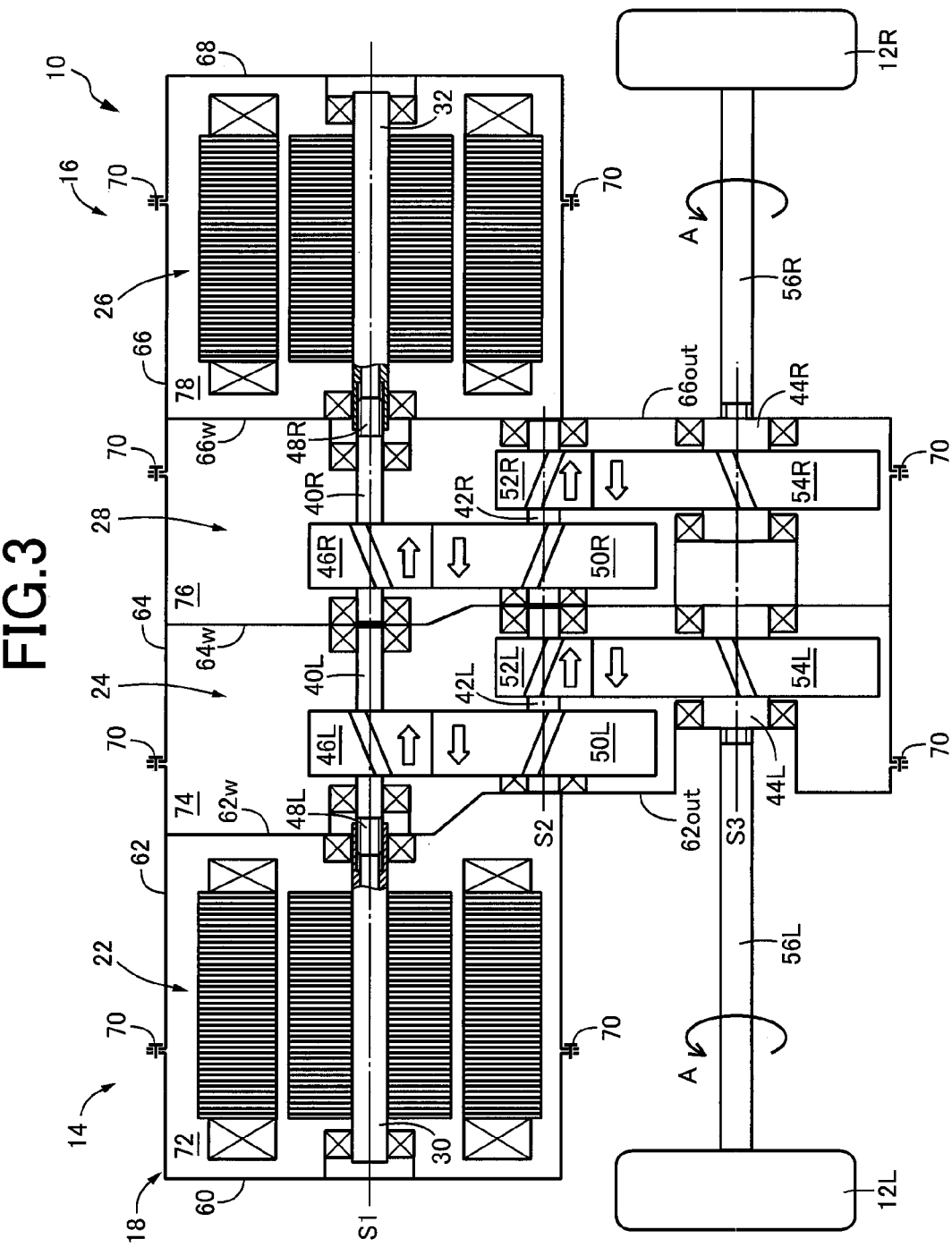
FIG. 3 is a view showing a direction of twist of teeth of each of helical gears provided in the electric drive unit shown in the electric drive unit, and also a thrust force applied to each of the helical gears.

In the present embodiment, each of the left-side and right-side gear transmission mechanisms 24, 28 includes the three rotary shafts 40, 42, 44 and the four gears 46, 50, 52, 54 provided on the rotary shafts 40, 42, 44. A positional relationship between the four gears 46L, 50L, 52L, 54L of the left-side gear transmission mechanism 24 and a positional relationship between the four of gears 46R, 50R, 52R, 54R of the right-side gear transmission mechanism 28 are the same as each other. Each of the gears 46L, 50L, 52L, 54L of the left-side gear transmission mechanism 24 and a corresponding one of the gears 46R, 50R, 52R, 54R of the right-side gear transmission mechanism 28 are identical with each other and disposed in the same attitude as each other. That is, each of the gears 46L, 50L, 52L, 54L of the left-side gear transmission mechanism 24 and a corresponding one of the gears 46R, 50R, 52R, 54R of the right-side gear transmission mechanism 28, which are identical with each other, are arranged to be parallelly offset from each other in the vehicle width direction. The identical gears are interpreted to mean gears that are the same as each other not only in terms of the number of teeth, pitch circle, circular pitch, twist angle of teeth, direction of twist of teeth, etc., but also in terms of a tooth face engaged with another gear (either when the wheels 12 as drive wheel are driven by the MGs 22, 26 as the drive sources or when the MGs 22, 26 are rotated by the wheels 12), retouched shape of the tooth face, etc. In the present embodiment, the gears 46, 50, 52, 54 of each of the left-side and right-side gear transmission mechanisms 24, 28 are constituted by respective helical gears. FIG. 3 is a view showing, by way of example, the direction of twist of the teeth of each of the helical gears. As shown FIG. 3, each of the gears 46L, 50L, 52L, 54L of the left-side gear transmission mechanism 24 and a corresponding one of the gears 46R, 50R, 52R, 54R of the right-side gear transmission mechanism 28 are the same as each other in terms of the direction of twist of the teeth and also a direction of a thrust force applied thereto, which is represented by white arrows. In the present embodiment, the helical gear constituting each of the drive gears 46L, 46R and the driven gears 54L, 54R has left-twisted teeth, while the helical gear constituting each of the large-diameter gears 50L, 50R and the small-diameter gear 52L, 52R has right-twisted teeth. It is noted that FIG. 3 shows the direction of the thrust force applied to each of the gears 46, 50, 52, 54 in a case in which the vehicle 8 is driven to run in forward direction, and that the direction of the thrust force is inverted in a case in which the vehicle 8 is driven to run in reverse direction or the MGs 22, 26 as the drive sources are rotated by the wheels 12 as the drive wheels.

Since the positional relationship between the four gears 46L, 50L, 52L, 54L of the left-side gear transmission mechanism 24 and the positional relationship between the four of gears 46R, 50R, 52R, 54R of the right-side gear transmission mechanism 28 are the same as each other, as described above, an axial distance between the left-side MG 22 and the drive gear 46L and an axial distance between the right-side MG 26 and the drive gear 46R is different from each other, because the left-side and right-side MGs 22, 26 are disposed to have inward attitudes and are opposed to each other in the vehicle width direction. That is, a positional relationship between the drive gear 46L and the splines 48L in the input rotary shaft 40L of the left-side gear transmission mechanism 24 and a positional relationship between the drive gear 46R and the splines 48R in the input rotary shaft 40R of the right-side gear transmission mechanism 28 are inverted left and right, and an axial distance between the drive gear 46L and the splines 48L and an axial distance between the drive gear 46R and the splines 48R are different from each other. In the present embodiment, the axial distance between the drive gear 46R and the splines 48R on the input rotary shaft 40R of the right-side gear transmission mechanism 28 is larger than the axial distance between the drive gear 46L and the splines 48L on the input rotary shaft 40L of the left-side gear transmission mechanism 24, so that a rigidity of the input rotary shaft 40R is lower than a rigidity of the input rotary shaft 40L whereby a resonance frequency of the input rotary shaft 40R is lower than a resonance frequency of the input rotary shaft 40L.

The casing 18 is sectioned into a plurality of spaces that are arranged in the vehicle width direction, and is constituted by five casing members 60, 62, 64, 66, 68. Each adjacent pair of the five casing members 60, 62, 64, 66, 68 are in contact in their outer peripheral end portions with each other, and are fixed to each other by a plurality of bolts 70. Each of the bolts 70 is provided to extend substantially in the vehicle width direction, i.e., in a direction parallel to the axes S1-S3, and is screwed in an internal thread or a nut member provided in the casing members 60, 62, 64, 66, so as to integrally fix the casing members 60, 62, 64, 66, 68 to one another. Further, the casing members 62, 64, 66, which are intermediate three among the five casing members 60, 62, 64, 66, 68, are provided integrally with respective partition walls 62w, 64w, 66w that extend inwardly in a direction substantially perpendicular to the axes S1-S3, such that four housing spaces 72, 74, 76, 78 are defined by cooperation of the casing members 60, 62, 64, 66, 68 and the partition walls 62w, 64w, 66w. The left-side MG 22, left-side transmission mechanism 24, right-side transmission mechanism 28 and right-side MG 26 are disposed in the four housing spaces 72, 74, 76, 78, respectively. For cooling the MG 22 and MG 26 and lubricating the gears 46, 50, 52, 54 and bearings, lubricant oil is supplied to the housing spaces 72, 74, 76, 78 through lubrication circuit (not shown). The housing spaces 72, 74, 76, 78 are held in communication with one another through cutouts, communication holes or the like, so that the lubricant oil can be distributed.

Each of the three rotary shafts 40, 42, 44 of the left-side and right-side gear transmission mechanisms 24, 28 is rotatably supported at its axially opposite end portions by a corresponding two of the partition walls 62w, 64w, 66w and outer walls 62out, 66out through bearings, wherein each of the outer walls 62out, 66out is contiguous with a corresponding one of the partition walls 62w, 66w, as shown in FIG. 2. Each of the intermediate rotary shafts 42L, 42R, which are provided with the large-diameter gear 50L, 50R and the small-diameter gear 52L, 52R, is supported at its axially opposite end portions through the bearings 80L, 82L or bearings 80R, 82R, such that at least a part of the bearing 80L, which is disposed on a side of the large-diameter gear 50L, is located on an inner peripheral side of the large-diameter gear 50L, and such that at least a part of the bearing 80R, which is disposed on a side of the large-diameter gear 50R, is located on an inner peripheral side of the large-diameter gear 50R. That is, at least the part of the bearing 80 overlaps with the large-diameter gear 50 in a direction parallel to the second axis S2 in each of the left-side and right-side gear transmission mechanisms 24, 28.

In the electric drive unit 10 according to the present embodiment, the positional relationship between the plurality of gears 46L, 50L, 52L, 54L of the left-side gear transmission mechanism 24 and the positional relationship between the plurality of gears 46R, 50R, 52R, 54R of the right-side gear transmission mechanism 28 are the same as each other, and each of the plurality of gears 46L, 50L, 52L, 54L of the left-side gear transmission mechanism 24 and a corresponding one of the plurality of gears 46R, 50R, 52R, 54R of the right-side gear transmission mechanism 28 are identical with each other and can be constituted by the same gears. Therefore, it is possible to reduce the manufacturing cost including the cost of design such as retouched shapes of tooth faces of each of the gears 46, 50, 52, 54, and to appropriately improve the NV performance of the electric drive unit 10 as a whole since the left-side and right-side gear transmission mechanisms 24, 28 are made the same as each other in terms of the characteristics of the NV.

Further, each of the left-side and right-side gear transmission mechanisms 24, 28 includes, as one of the plurality of rotary shafts 40, 42, 44, the input rotary shaft 40 provided with the splines 48 and the drive gear 46, and the left-side and right-side gear transmission mechanisms 24, 28 are different from each other in terms of the axial distance between the splines 48 and the drive gear 46 of the input rotary shaft 40, such that the positional relationship between the plurality of gears 46L, 50L, 52L, 54L of the left-side gear transmission mechanism 24 and the positional relationship between the plurality of gears 46R, 50R, 52R, 54R of the right-side gear transmission mechanism 28 are the same as each other. Therefore, the left-side and right-side gear transmission mechanisms 24, 28 are made different from each other in terms of the rigidity of the input rotary shaft 40, thereby suppressing a resonance and accordingly further improving the NV performance.

Further, each of the left-side and right-side gear transmission mechanisms 24, 28 includes, as one of the plurality of rotary shafts 40, 42, 44, the intermediate rotary shaft 42 provided with the large-diameter gear 50 and the small-diameter gear 52 as ones of the plurality of gears 46, 50, 52, 54, which are axially spaced apart from each other, and the intermediate rotary shaft 42 is supported by the bearing 80, such that at least the part of the bearing 80 is located on the inner peripheral side of the large-diameter gear 50. Therefore, it is possible to reduce a dimension of a part of the electric drive unit 10 in the axial direction, i.e., the vehicle width direction, wherein the intermediate rotary shaft 42 of each of the left-side and right-side gear transmission mechanisms 24, 28 is disposed in the part of the electric drive unit 10. The reduction of the dimension of the above-described part of the electric drive unit 10 results in improvement of the mountability of the electric drive unit 10 in the electric vehicle 8.

Further, the plurality of rotary shafts 40L, 42L, 44L of the left-side gear transmission mechanism 24 and the plurality of rotary shafts 40R, 42R, 44R of the right-side gear transmission mechanism 28 are disposed on the respective common first, second and third axes S1, S2, S3, and each of the plurality of gears 46L, 50L, 52L, 54L of the left-side gear transmission mechanism 24 and the corresponding one of the plurality of gears 46R, 50R, 52R, 54R of the right-side gear transmission mechanism 28 are arranged to be parallelly offset from each other in the vehicle width direction. Therefore, the left-side and right-side gear transmission mechanisms 24, 28 are identical in construction with each other, so that the electric drive unit 10 can be easily constructed with a low cost.

Further, all of the plurality of gears 46, 50, 52, 54 of each of the left-side and right-side gear transmission mechanisms 24, 28 are the helical gears, and the left-side and right-side gear transmission mechanisms 24, 28 are housed in the common casing 18 constituted by the plurality of casing members 60, 62, 64, 66, 68 which are arranged in the vehicle width direction and which are fixed to each other, such that each adjacent pair of the casing members 60, 62, 64, 66, 68 are held in contact at their respective contact surfaces with other. Therefore, when the helical gears 46, 50, 52, 54 are rotated, the thrust force applied to each of the helical gears 46L, 50L, 52L, 54L of the left-side gear transmission mechanism 24 and the thrust force applied to a corresponding one of the helical gears 46R, 50R, 52R, 54R of the right-side gear transmission mechanism 28 act in the same direction, so that it is possible to reduce a load that forcing the contact surfaces (of each adjacent pair of the casing members 62, 64, 66 supporting the rotary shafts 40, 42, 44) to be separated from each other, and accordingly to suppress oil leakage or the like due to separation of the contact surfaces away from each other.

Further, the left side and right-side MGs 22, 26 are arranged to be symmetrical with each other and spaced apart from each other in the vehicle width direction, and the left-side and right-side gear transmission mechanisms 24, 28 are disposed between the left side and right-side MGs 22, 26 in the vehicle width direction. Therefore, the left-side and right-side gear transmission mechanisms 24, 28 can be disposed in respective positions close to each other in the vehicle width direction, so that the electric drive unit 10 can be made compact in size, for example, by housing both of the left-side and right-side gear transmission mechanisms 24, 28 in the common casing 18.

There will be described another embodiment of this invention. The same reference signs as used in the above-described embodiment will be used in the following embodiment, to identify the practically corresponding elements, and descriptions thereof are not provided.

Figure 4:
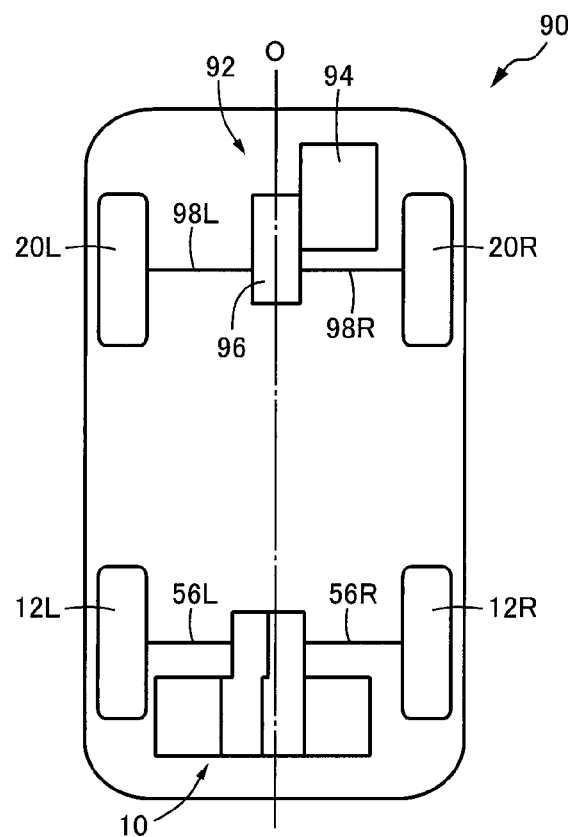
FIG. 4 is a view showing a drive apparatus as another embodiment of the present invention, wherein the drive apparatus further includes an electric drive unit provided for front wheels in a front/rear wheel drive electric vehicle.

FIG. 4 is a view showing a drive apparatus as another embodiment of the present invention, wherein the drive apparatus includes a front-side electric drive unit 92 provided to drive and rotate the front left and right wheels 20L, 20R, in addition to the above-described electric drive unit 10 provided to drive and rotate the rear left and right wheels 12L, 12R, in a front/rear wheel drive vehicle. The front-side electric drive unit 92 includes a front-side MG 94 serving as a drive source and a transaxle 96, wherein the front-side MG 94 is constituted by a single motor generator that is disposed transversely. The transaxle 96 includes a speed reducer and a differential gear device, so that the drive power is distributed through the differential gear device to left and right drive shafts 98L, 98R, and the front left and right wheels 20L, 20R are rotatable differentially.

In the present embodiment, the end portions of the output rotary shaft 44L, 44R, which are supported by the bearings 82L, 80R (see FIG. 2), are located in a position lying on a centerline O in a width direction of the electric vehicle 90, and a center of gravity of the electric drive unit 10 is located on left side of the centerline O. Further, the front-side MG 94 is located on right side of the transaxle 96 in the front-side electric drive unit 92, with a center of the differential gear device of the transaxle 96 lies on the centerline O, so that a center of gravity of the front-side electric drive unit 92 is located on right side of the centerline O. Thus, the electric drive unit 10 and the front-side electric drive unit 92 are disposed such that the center of gravity of the electric drive unit 10 and the center of gravity of the front-side electric drive unit 92 are located on respective opposite sides of the centerline O, so that the electric vehicle 90 as a whole has an improved weight balance thereby improving drivability such as running stability.

It is to be understood that the embodiments described above are given for illustrative purpose only, and that the present invention may be embodied with various modifications and improvements which may occur to those skilled in the art.

NOMENCLATURE OF ELEMENTS

- 10: electric drive unit (drive apparatus for vehicle)
- 12L: rear left wheel (left wheel)
- 12R: rear right wheel (right wheel)
- 18: casing
- 22: left-side MG (left-side drive source)
- 24: left-side gear transmission mechanism
- 26: right-side MG (right-side drive source)
- 28: right-side gear transmission mechanism
- 30, 32: MG shaft (output shaft)
- 40L, 40R: input rotary shaft (rotary shaft, connection rotary shaft)
- 42L, 42R: intermediate rotary shaft (rotary shaft)
- 44L, 44R: output rotary shaft (rotary shaft)
- 46L, 46R: drive gear (gear)
- 48L, 48R: splines
- 50L, 50R: large-diameter gear (gear)
- 52L, 52R: small-diameter gear (gear)
- 54L, 54R: driven gear (gear)
- 56L, 56R: drive shaft
- 60, 62, 64, 66, 68: casing member
- 80L, 80R: bearing
- S1: first axis
- S2: second axis
- S3: third axis

What is claimed is:

1. A drive apparatus for a vehicle that includes left and right wheels, the drive apparatus comprising:
   a left-side drive source configured to drive the left wheel;
   a right-side drive source configured to drive the right wheel;
   a left-side gear transmission mechanism which is disposed in a power transmission path between the left-side drive source and the left wheel; and
   a right-side gear transmission mechanism which is disposed in a power transmission path between the right-side drive source and the right wheel and which has the same gear ratio as the left-side gear transmission mechanism,
   wherein each of the left-side gear transmission mechanism and the right-side gear transmission mechanism includes a plurality of rotary shafts that extend substantially in parallel to a width direction of the vehicle, and a plurality of gears provided on the plurality of rotary shafts,
   wherein a number of the plurality of rotary shafts of the left-side gear transmission mechanism and a number of the plurality of rotary shafts of the right-side gear transmission mechanism are the same as each other, and a number of the plurality of gears of the left-side gear transmission mechanism and a number of the plurality of gears of the right-side gear transmission mechanism are the same as each other,
   wherein a positional relationship between the plurality of gears of the left-side gear transmission mechanism and a positional relationship between the plurality of gears of the right-side gear transmission mechanism are the same as each other,
   wherein each of the plurality of gears of the left-side gear transmission mechanism and a corresponding one of the plurality of gears of the right-side gear transmission mechanism are identical with each other and disposed in the same attitude as each other,
   wherein each of the left-side gear transmission mechanism and the right-side gear transmission mechanism includes, as one of the plurality of rotary shafts, an intermediate rotary shaft provided with a large-diameter gear and a small-diameter gear as ones of the plurality of gears, and
   wherein the left-side gear transmission mechanism and the right-side gear transmission mechanism are the same as each other in that the large-diameter gear is located on one of right and left sides of the small-diameter gear in the width direction of the vehicle.

2. The drive apparatus according to claim 1,
   wherein each of the left-side gear transmission mechanism and the right-side gear transmission mechanism includes, as one of the plurality of rotary shafts, a connection rotary shaft provided with splines and one of the plurality of gears, and
   wherein the left-side gear transmission mechanism and the right-side gear transmission mechanism are different from each other in terms of an axial distance between the splines and the one of the plurality of gears of the connection rotary shaft, such that the positional relationship between the plurality of gears of the left-side gear transmission mechanism and the positional relationship between the plurality of gears of the right-side gear transmission mechanism are the same as each other.

3. The drive apparatus according to claim 1,
   wherein the large-diameter gear and the small-diameter gear are axially spaced apart from each other, and
   wherein the intermediate rotary shaft is supported by a bearing, such that at least a part of the bearing is located on an inner peripheral side of the large-diameter gear.

4. The drive apparatus according to claim 1, wherein the plurality of rotary shafts of the left-side gear transmission mechanism and the plurality of rotary shafts of the right-side gear transmission mechanism are disposed on at least one common axis, and wherein each of the plurality of gears of the left-side gear transmission mechanism and a corresponding one of the plurality of gears of the right-side gear transmission mechanism are arranged to be parallelly offset from each other in the width direction of the vehicle.

5. The drive apparatus according to claim 1,
wherein the plurality of gears of each of the left-side gear transmission mechanism and the right-side gear transmission mechanism include at least one pair of helical gears that mesh with each other, and
wherein the left-side gear transmission mechanism and the right-side gear transmission mechanism are housed in a common casing constituted by a plurality of casing members which are arranged in the width direction of the vehicle and which are fixed to each other.

6. The drive apparatus according to claim 1,
wherein the left-side drive source and the right-side drive source are arranged to be symmetrical with each other and spaced apart from each other in the width direction of the vehicle,
wherein the left-side drive source and the right-side drive source have respective output shafts which extend substantially in parallel to the width direction of the vehicle, and
wherein the left-side gear transmission mechanism and the right-side gear transmission mechanism are disposed between the left-side drive source and the right-side drive source in the width direction of the vehicle.

7. The drive apparatus according to claim 6,
wherein the output shafts of the left-side drive source and the right-side drive source are disposed commonly on a first axis that is substantially parallel to the width direction of the vehicle,
wherein the plurality of rotary shafts of each of the left-side gear transmission mechanism and the right-side gear transmission mechanism include an input rotary shaft and an output rotary shaft,
wherein the input rotary shaft of each of the left-side gear transmission mechanism and the right-side gear transmission mechanism is disposed on the first axis, and is provided with splines and a drive gear that is one of the plurality of gears,
wherein the input rotary shaft of the left-side gear transmission mechanism is connected to the left-side drive source through the splines in a power transmittable manner, while the input rotary shaft of the right-side gear transmission mechanism is connected to the right-side drive source through the splines in a power transmittable manner, wherein the intermediate rotary shaft of each of the left-side gear transmission mechanism and the right-side gear transmission mechanism is disposed on a second axis that is parallel to the first axis such that the large-diameter gear and the small-diameter gear are axially spaced apart from each other, and such that rotation is to be transmitted to the large-diameter gear from the drive gear, wherein the output rotary shaft of each of the left-side gear transmission mechanism and the right-side gear transmission mechanism is disposed on a third axis that is parallel to the first axis, and is provided with a driven gear as one of the plurality of gears, such that rotation is to be transmitted to the driven gear from the small-diameter gear, wherein the output rotary shaft of each of the left-side gear transmission mechanism and the right-side gear transmission mechanism is connected to a drive shaft of the vehicle in a power transmittable manner, wherein the positional relationship among the drive gear, the large-diameter gear, the small-diameter gear and the driven gear of the left-side gear transmission mechanism and the positional relationship among the drive gear, the large-diameter gear, the small-diameter gear and the driven gear of the right-side gear transmission mechanism are the same as each other, wherein each of the drive gear, the large-diameter gear, the small-diameter gear and the driven gear of the left-side gear transmission mechanism and a corresponding one of the drive gear, the large-diameter gear, the small-diameter gear and the driven gear of the right-side gear transmission mechanism are arranged to be parallelly offset from each other in the width direction of the vehicle, and wherein the drive gear is located on one of opposite sides of the splines in the width direction of the vehicle in the left-side gear transmission mechanism while the drive gear is located on the other of the opposite sides of the splines in the width direction of the vehicle in the right-side gear transmission mechanism, and an axial distance between the drive gear and the splines in the left-side gear transmission mechanism and an axial distance between the drive gear and the splines in right-side gear transmission mechanism are different from each other, such that the positional relationship among the drive gear, the large-diameter gear, the small-diameter gear and the driven gear of the left-side gear transmission mechanism and the positional relationship among the drive gear, the large-diameter gear, the small-diameter gear and the driven gear of the right-side gear transmission mechanism are the same as each other.

* * * * *